(12) United States Patent
Wyler

(10) Patent No.: US 8,816,822 B2
(45) Date of Patent: Aug. 26, 2014

(54) METHOD AND SYSTEM FOR WIRELESS COMMUNICATIONS IN A WAVEGUIDE ENVIRONMENT

(75) Inventor: John Stephen Wyler, Berwyn, PA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 13/052,672

(22) Filed: Mar. 21, 2011

(65) Prior Publication Data
US 2012/0242454 A1 Sep. 27, 2012

(51) Int. Cl.
*H04Q 5/22* (2006.01)
*H04Q 9/00* (2006.01)
*H04B 17/00* (2006.01)

(52) U.S. Cl.
CPC .............. *H04Q 9/00* (2013.01); *H04B 17/0032* (2013.01); *H04B 17/0085* (2013.01); *H04B 17/0057* (2013.01); *H04Q 2209/886* (2013.01); *H04B 17/0012* (2013.01)
USPC ........... 340/10.1; 340/1.1; 340/3.5; 340/3.51; 340/10.3; 340/10.4; 340/10.5; 340/10.6; 340/12.5; 340/12.51; 340/572.1; 455/73; 455/98; 455/404.2; 455/412.2; 455/419; 455/440; 455/456.1; 701/2; 701/3

(58) Field of Classification Search
CPC ............ G06K 7/0008; G06K 19/0723; G06K 19/07749; G06K 2017/0045; G06K 19/0701; G07C 9/00111; H04B 17/0012; H04B 17/0032; H04B 17/0057; H04B 17/0085; H04Q 2209/886; H04Q 9/00
USPC ............... 340/10.1, 1.1, 3.5, 3.51, 10.3, 10.4, 340/10.5, 10.6, 12.5, 12.51, 572.1, 572.7; 455/73, 98, 404.2, 412.1, 414.2, 419, 455/440, 456.1; 701/2, 3
See application file for complete search history.

(56) References Cited

U.S. PATENT DOCUMENTS

| 6,353,734 | B1 | 3/2002 | Wright et al. | |
|---|---|---|---|---|
| 7,035,632 | B2 | 4/2006 | Gutowski | |
| 7,446,662 | B1 * | 11/2008 | Somogyi et al. | ........... 340/572.4 |
| 2002/0167397 | A1 * | 11/2002 | Eroglu et al. | ................ 340/10.6 |

(Continued)

FOREIGN PATENT DOCUMENTS

WO 2008070504 A2 6/2008

OTHER PUBLICATIONS

Search Report from EP Application No. 12160226.2 dated Aug. 8, 2013.

*Primary Examiner* — Steven Lim
*Assistant Examiner* — Sisay Yacob
(74) *Attorney, Agent, or Firm* — William Scott Andes, Esq.; Armstrong Teasdale LLP

(57) ABSTRACT

A system and method of transmitting sensor signals in a waveguide environment are provided. A sensor assembly is configured to wirelessly receive a sensor interrogation signal, determine an input power level of the sensor interrogation signal, and transmit a message including the determined power level. The system also includes a sensor controller configured to transmit a sensor interrogation signal determine an output power of the transmitted sensor interrogation signal at a plurality of frequencies, receive an indication of the received input power level of the sensor interrogation signal from the sensor assembly at the plurality of frequencies, compare the transmitted output power of the sensor interrogation signal to the received power indication, and select a transmit frequency for transmitting messages between the sensor assembly and the sensor controller based on the comparison.

16 Claims, 2 Drawing Sheets

(56) References Cited

U.S. PATENT DOCUMENTS

| | | | |
|---|---|---|---|
| 2004/0140906 A1* | 7/2004 | Fujimoto | 340/825.49 |
| 2007/0018793 A1* | 1/2007 | Stewart et al. | 340/10.3 |
| 2007/0063847 A1* | 3/2007 | Lee et al. | 340/572.1 |
| 2007/0133483 A1* | 6/2007 | Lee et al. | 370/338 |
| 2008/0100439 A1* | 5/2008 | Rinkes | 340/572.1 |
| 2008/0100450 A1* | 5/2008 | Ayyagari et al. | 340/572.7 |
| 2008/0224870 A1* | 9/2008 | Yeo et al. | 340/572.1 |
| 2008/0280625 A1 | 11/2008 | Larsen | |
| 2009/0002176 A1* | 1/2009 | Bekritstky et al. | 340/572.7 |
| 2009/0102642 A1* | 4/2009 | Huseth et al. | 340/539.13 |
| 2009/0243801 A1* | 10/2009 | Strzelczyk | 340/10.1 |
| 2010/0014571 A1 | 1/2010 | Horton et al. | |
| 2010/0271186 A1* | 10/2010 | Tanaka et al. | 340/10.3 |

\* cited by examiner

METHOD AND SYSTEM FOR WIRELESS COMMUNICATIONS IN A WAVEGUIDE ENVIRONMENT

BACKGROUND OF THE INVENTION

The field of the invention relates generally to wireless communications, and more specifically, to a method and system for improving communications of self-powered wireless sensors in a waveguide environment.

At least some known aircraft manufacturers are considering using wireless networking technology in airplane systems to minimize weight, improve reliability and safety, and to reduce maintenance costs. Wireless technology has been deployed for internet access using standard WIFI technology, but wireless technology has yet to be used for aircraft critical systems. Achieving the benefits of wireless technology will require the deployment of many autonomous wireless sensors and actuators on an airplane.

Communications with sensors without using wires or fiber provides a major benefit in weight savings. However, for autonomous sensors to be effective, power requirement minimization is needed. Moreover, in situations using standard RF transmission where signal levels will vary with distance and time, referred to as fading also could benefit from power requirement minimization techniques. The current method of mitigating fading effects is to adjust the gain of the receiver circuit to maintain a constant signal level. However, that approach is not a desirable solution for aircraft wireless systems because of power limitations.

BRIEF DESCRIPTION OF THE INVENTION

In one embodiment, a wireless sensor system includes a sensor assembly including a radio frequency transceiver configured to wirelessly receive a sensor interrogation signal, determine an input power level of the sensor interrogation signal, and transmit a message including the determined power level. The system also includes a sensor controller including a radio frequency transceiver configured to transmit a sensor interrogation signal at a first frequency and at a second frequency wherein the second frequency is different than the first frequency. The sensor controller includes a processor and a memory programmed with instructions that cause the sensor controller to transmit a sensor interrogation signal into an aircraft fuselage at a frequency that varies over time, determine an output power of the transmitted sensor interrogation signal at a plurality of frequencies, receive an indication of the received input power level of the sensor interrogation signal from the sensor assembly at the plurality of frequencies, compare the transmitted output power of the sensor interrogation signal to the received power indication, and select a transmit frequency for transmitting messages between the sensor assembly and the sensor controller based on the comparison.

In another embodiment, a method of transmitting sensor signals includes transmitting a sensor interrogation signal into an aircraft fuselage at a frequency that varies over time, determining an output power of the transmitted sensor interrogation signal at a plurality of frequencies, receiving an indication of a received power of the sensor interrogation signal from a wireless sensor at the plurality of frequencies, comparing the transmitted output power of the sensor interrogation signal to the received power indication, and selecting a transmit frequency based on the comparison.

In yet another embodiment, a sensor controller system includes a radio frequency transceiver configured to transmit data messages and to receive data messages at a plurality of predetermined frequencies and a processor including a memory and programmed to transmit a plurality of sensor interrogation signals into an aircraft fuselage wherein each of the plurality of sensor interrogation signals is transmitted at a respective frequency different than others of respective frequencies. The processor is also programmed to determine an output power of each of the transmitted plurality of sensor interrogation signals at the respective frequency, receive an indication of a received power of at least one of the plurality of sensor interrogation signals from a wireless sensor at the respective frequencies, compare the transmitted output power of the sensor interrogation signal to the received power indication, and select a transmit frequency based on the comparison.

BRIEF DESCRIPTION OF THE DRAWINGS

FIG. 1 is a partial cutaway diagram of an aircraft fuselage in accordance with an exemplary embodiment of the present invention; and FIG. 2 is a flow diagram of a method of transmitting sensor signals in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of communication between wireless devices subject to a waveguide environment in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention describe a method of adjusting the frequency of operation of on aircraft wireless networks to take advantage of the waveguide effects of the airplane structure to minimize transmitted signal path loss. By minimizing path loss the power required for transmission can also be minimized.

Figure 1:
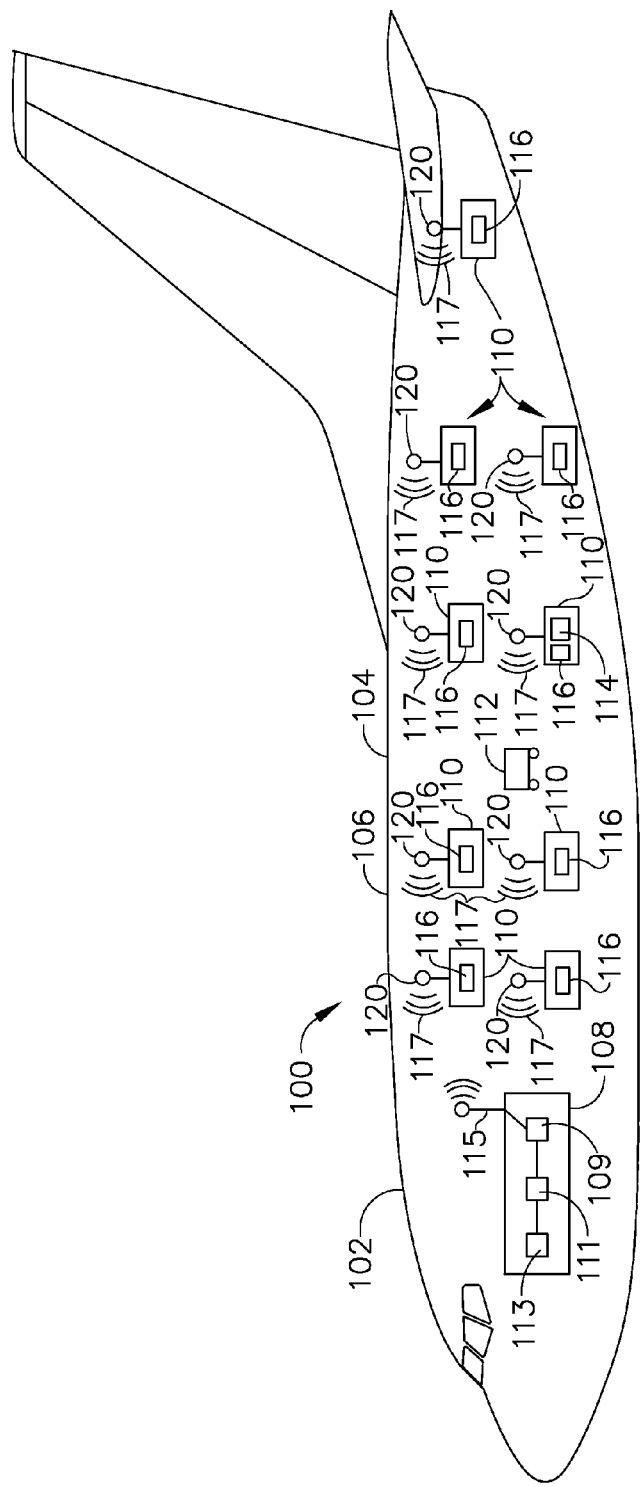
FIGS. 1-2 show exemplary embodiments of the method and system described herein.

FIG. 1 is a partial cutaway diagram of an aircraft fuselage 100 in accordance with an exemplary embodiment of the present invention. In the exemplary embodiment, fuselage 100 includes a forward end 102, an aft end 104, and a body 106 extending therebetween. A sensor controller 108 including a radio frequency transceiver 109 may be positioned at a selected location within fuselage 100. A plurality of wireless sensor assemblies 110 including respective radio frequency transceivers 116 may also be selectively positioned within fuselage 100. Sensor controller 108 also includes a processor 111 communicatively coupled to a memory 113. In one embodiment, radio frequency transceivers 109 and/or 116 may comprises a transmitter and receiver combination in one unit that share common circuitry or may comprise separate transmitter and receiver components. Moreover, radio frequency transceivers 109 and/or 116 may operate in a full duplex mode or a half duplex mode. Further, radio frequency transceivers 109 and/or 116 include respective antennae 115 and 120 configured for operation at frequencies and distances as described herein. As used herein, wireless sensor assemblies 110 may also include actuators, other transceivers used to form a wireless network, or other devices such as wireless headphones.

Radio frequency transceiver 109 is configured to transmit and receive electromagnetic radiation in the radio frequency (RF) band. Radio frequency transceiver 109 transmits and receives messages 117 to and from wireless sensors 110. Wireless sensors 110 include a controllable device such as, but not limited to, an actuator, or a sensing device configured to measure or detect physical parameters in their vicinity. Wireless sensors 110 include at least one antenna 120 that facilitates communication between wireless sensor and sensor controller 108. In the exemplary embodiment, fuselage 100 is a relatively large, substantially cylindrical structure formed of a metallic material, such as, but not limited to, aluminum or an aluminum alloy. Such a structure acts as a waveguide for electromagnetic radiation. Additionally, such a structure may affect the electromagnetic wave such that particular locations a distance from transceiver may receive a significantly attenuated RF signal from transceiver 109 as compared to the power level of the transmitted signal. Other locations may receive a signal that may be only slightly attenuated as compared to the transmitted signal. The attenuation experienced by the signal is related to the shape of the fuselage and the position, geometry, and material of construction of other material within fuselage 100. For example, a drink cart 112 is typically formed of metal and is repositioned along a length of body 106 during use. Drink cart 112 may affect the waveguide characteristics of fuselage 100. Other objects may also affect the waveguide characteristics of fuselage 100, such as, passengers moving about the fuselage.

During operation, transceiver 109 and wireless sensors 110 communicate using RF energy transmitted between them. In the exemplary embodiment, wireless sensors 110 are low-power devices that have a limited transmit power capability. To ensure proper communication between transceiver 109 and sensors 110, attenuation of the communication signal is facilitated being reduced by actively controlling the waveguide characteristics of fuselage 100. In the exemplary embodiment, a frequency of transmission of the RF signal used to communicate between transceiver 109 and sensors 110 is adjusted dynamically to improve a power received by transceiver 109 from sensors 110 and received by sensors 110 from transceiver 109. In one embodiment, a frequency of the electromagnetic signal transmitted between sensors 110 and transceiver 109 is adjusted to provide a relatively high power signal as compared to other possible frequencies of the electromagnetic signal.

At startup, transceiver 109 may transmit RF message 117 at a plurality of different frequencies. Each of the sensors 110 that receive the signal may respond to message 117 with an indication of the power of the received signal. The response message 117 may also include a location of the responding sensor. In the exemplary embodiment, the plurality of different frequencies are swept through a predetermined range of frequencies. For each of the plurality of different frequencies, sensors 110 determine a received power of the received message signal. Because the airplane structure acts as a waveguide for RF energy, path loss data indicate that the fuselage has mode frequencies at which the message signals are transmitted with very little loss. There are also anti-mode frequencies at which the signal is attenuated. Sensor controller 108 and more specifically processor 111 and memory 113 of sensor controller 108 are programmed to select the operating frequency of the wireless network to coincide with one of the transmission peaks within a range of approximately 50 MHz. Adjusting the operating frequency over this band width is accomplished using 111 and memory 113 controlling a transmit circuit of transceiver 108. Additionally, a design of antennae 115 and 120 are optimized to operate over a predetermined range of frequencies.

Autonomous wireless sensor assemblies 110 use a power source 114 for the onboard sensors and actuators. In one embodiment, power source 114 is a battery that is replaced periodically or recharged. In various embodiments, energy is harvested from the environment using for example, but not limited to temperature differentials, magnetic, electromagnetic, or vibratory energy as a source. In another embodiment, passive RFID sensors are used. Each of the above power strategies provides only small amounts of power for the sensor circuitry. It is therefore important to minimize the power consumption of the circuitry.

The power consumption of the circuitry is directly related to the power level that the sensor signal is transmitted at to reliably reach the transceiver 109. Acceptable power levels can be calculated based on acceptable signal error rates and noise levels, but the major determinant is the path loss of the signal over the transmission path. In the exemplary embodiment, the path loss is minimized, for example by using the methods described herein, which in turn minimizes the power consumption of sensor assembly 110.

Figure 2:
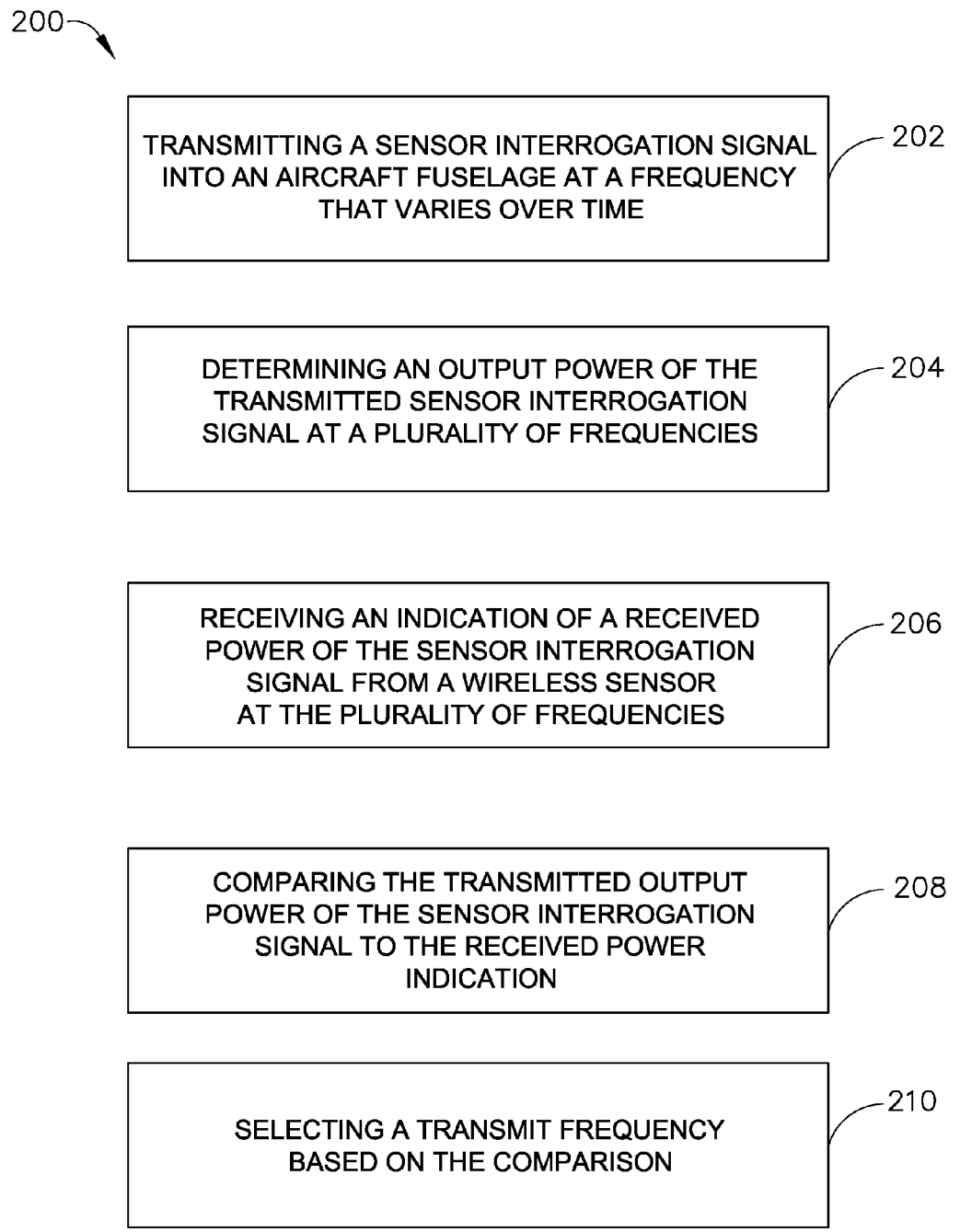

FIG. 2 is a flow diagram of a method 200 of transmitting sensor signals in accordance with an exemplary embodiment of the present invention. In the exemplary embodiment, method 200 includes transmitting 202 a sensor interrogation signal into an aircraft fuselage at a frequency that varies over time. Because the aircraft fuselage acts as a waveguide, signals of different frequencies experience different amounts of signal path losses. By transmitting sensor interrogation signals at different frequencies into the aircraft fuselage, the frequency that yields the largest power ratio, or ratio of the power of the sensor interrogation signal received by a wireless sensor positioned within the aircraft fuselage in relation to the power level of the transmitted sensor interrogation signal can be determined.

Method 200 also includes determining 204 an output power of the transmitted sensor interrogation signal at a plurality of frequencies. In the exemplary embodiment, a sensor controller transmitting the sensor interrogation signal determines the output power of the transmitted sensor interrogation signal. Method 200 further includes receiving 206 an indication of a received power of the sensor interrogation signal from a wireless sensor at the plurality of frequencies. To determine a power ratio of the transmitted sensor interrogation signal, the sensor controller or the sensor assembly needs both the output power value of the transmitted sensor interrogation signal and the power level of the signal received by the sensor assembly. In one embodiment, the sensor controller transmits the measured transmit power level to the sensor assembly, the sensor assembly measures the received input power level, determines the power ratio and adjusts its transmission frequency to the frequency having the largest power ratio. Alternatively, the sensor assembly measures the received input power level, transmits the measured power level to the sensor controller, which determines the power ratio and adjusts its transmission frequency to the frequency having the largest power ratio and transmits this frequency to the sensor assembly so the sensor assembly can adjust its operating frequency to the most efficient frequency for its location. Method 200 also includes comparing 208 the transmitted output power of the sensor interrogation signal to the received power indication and selecting 210 a transmit frequency based on the comparison.

The plurality of sensor assemblies 110 are configured to transmit messages 117 to sensor controller 108 on a frequency at which a power ratio of the input power level of the sensor interrogation signal measured by that sensor assembly 110 and the transmitted output power is greater than the power ratio determined at the others of the plurality of frequencies.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 111, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is a power minimization technique to enable the application of wireless technology to aircraft wireless sensors and other RF transmission where signal levels vary with distance and time, referred to as fading. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of communicating wirelessly in a waveguide environment provides a cost-effective and reliable means for determining an operating frequency for an autonomous sensor that provides an optimal power ratio for minimizing power consumed by the sensor for communication with a remote sensor controller. More specifically, the methods and systems described herein facilitate transmitting one or more messages to all autonomous sensors and from the sent and received characteristics of the one or more messages, determining an optimal operating frequency and transmission power level. In addition, the above-described methods and system facilitate regaining communication with a sensor after communications is lost and periodically determining the optimal operating frequency to account for changes in the waveguide properties of the environment due to movement of people and/or equipment within the waveguide structure. As a result, the methods and systems described herein facilitate wireless communication in a waveguide environment in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wireless sensor system comprising:
a plurality of sensor assemblies positioned remotely from each other, each sensor assembly comprising a radio frequency transceiver configured to wirelessly receive a sensor interrogation signal that includes an indication of a measured transmit power level, each sensor assembly of said plurality of sensor assemblies configured to:
measure an input power level of the received sensor interrogation signal,
determine an input power level of the sensor interrogation signal,
determine a power ratio of the sensor interrogation signal using the indication of the measured transmit power level and the input power level of the received sensor interrogation signal, and
transmit a message including the determined power level and the power ratio of the sensor interrogation signal; and
a sensor controller positioned remotely from said plurality of sensor assemblies, said sensor controller comprising a radio frequency transceiver configured to transmit a sensor interrogation signal at a first frequency and at a second frequency, the second frequency different than the first frequency, said sensor controller comprising a processor and a memory programmed with instructions that cause the sensor controller to:
transmit a sensor interrogation signal into an aircraft fuselage at a frequency that varies over time;
determine an output power of the transmitted sensor interrogation signal at a plurality of frequencies;
receive a message from each said sensor assembly including the power ratio of the interrogation signal at the plurality of frequencies received by each said sensor assembly, the power ratio determined by each said sensor assembly; and
select a transmit frequency for transmitting messages between each said sensor assembly and said sensor controller based on the received messages, wherein the transmit frequency is a frequency at which a power ratio of the input power level of the sensor interrogation signal measured by a particular sensor assembly and the transmitted output power is greater than power ratios determined at the others of the plurality of frequencies.

2. The system of claim 1, wherein said plurality of sensor assemblies each determine their respective frequency of transmission independent of said sensor controller and each other, each of said plurality of sensor assemblies configured to transmit messages to said sensor controller on the determined frequency.

3. The system of claim 1, wherein said sensor assembly is configured to adjust its transmission frequency to a frequency received from the sensor controller that matches a frequency determined as having the largest power ratio.

4. The system of claim 1, wherein said sensor assembly determines a power ratio of the transmitted output power and the input power level received by said sensor assembly, an indication of the transmitted output power being received from said sensor controller in a message transmitted from said sensor controller.

5. The system of claim 1, wherein said sensor controller determines a power ratio of the transmitted output power and the input power level received by said sensor assembly, an indication of the input power level being received from said sensor assembly in a message transmitted from said sensor assembly.

6. A method of transmitting sensor signals comprising:
  transmitting a sensor interrogation signal into an aircraft fuselage at a frequency that varies over time;
  determining an output power of the transmitted sensor interrogation signal at a plurality of frequencies;
  receiving from each sensor assembly of a plurality of sensor assemblies an indication of a ratio of the determined output power and received power of the sensor interrogation signal at a particular sensor assembly at the plurality of frequencies; and
  selecting a transmit frequency corresponding to a mode frequency of the aircraft fuselage based on the received power ratio, the mode frequency being the frequency where a transmitted signal incurs a lesser loss than other frequencies, wherein the transmit frequency is a frequency at which a power ratio of the received power level at the particular sensor assembly and the transmitted output power is greater than power ratios determined at the others of the plurality of frequencies.

7. The method in accordance with claim 6, further comprising transmitting information to the wireless sensor at the selected frequency.

8. The method in accordance with claim 6, further comprising receiving information from the wireless sensor at the selected frequency.

9. The method in accordance with claim 6, wherein selecting a transmit frequency based on the comparison comprises selecting a transmit frequency based on the comparison of the transmitted output power of the sensor interrogation signal to the received power indication for more than one of the plurality of wireless sensors.

10. The method in accordance with claim 6, wherein selecting a transmit frequency based on the comparison comprises selecting a transmit frequency that provides a maximum total ratio of the received power indication to the transmitted output power for the more than one of the plurality of wireless sensors.

11. The method in accordance with claim 6, wherein selecting a transmit frequency comprises selecting a single transmit frequency.

12. The method in accordance with claim 6, wherein selecting a transmit frequency comprises selecting a plurality of transmit frequencies, such that each of the plurality of transmit frequencies corresponds to one or more of the plurality of wireless sensors.

13. A sensor controller system comprising:
  a radio frequency transceiver configured to transmit data messages and to receive data messages at a plurality of predetermined frequencies; and
  a processor comprising a memory and programmed to:
    transmit a plurality of sensor interrogation signals into an aircraft fuselage, each of the plurality of sensor interrogation signals transmitted at a respective frequency different than others of respective frequencies;
    determine an output power of each of the transmitted plurality of sensor interrogation signals at the respective frequency;
    receive a message from each of a plurality of wireless sensor assemblies including a power ratio for one or more of the of the plurality of sensor interrogation signals received by a particular sensor assembly, the power ratio determined by the sensor assembly;
    determine a mode frequency of the aircraft fuselage using the received message; and
    select the mode frequency as a transmit frequency for communications between the radio frequency transceiver and the particular wireless sensor assembly, wherein the transmit frequency is a frequency at which a power ratio of the received power level at the particular sensor assembly and the transmitted output power is greater than power ratios determined at the others of the plurality of frequencies.

14. The system of claim 13, wherein said processor is further programmed to select the transmit frequency having the largest ratio of the transmitted output power of the sensor interrogation signal to the received power indication.

15. The system of claim 13, wherein said processor is further programmed to periodically select a transmit frequency based on a comparison of a transmitted output power of a subsequent sensor interrogation signal to a received power indication of the subsequent sensor interrogation signal.

16. The system of claim 13, wherein said processor is further programmed to:
  monitor responses from the wireless sensor;
  transmit one or more sensor interrogation signals into the aircraft fuselage at the selected frequency for the non-responsive wireless sensor; and
  vary the frequency of the one or more sensor interrogation signals in a predetermined frequency range about the selected frequency.

* * * * *